United States Patent
Hvidsten et al.

(10) Patent No.: US 10,404,319 B1
(45) Date of Patent: Sep. 3, 2019

(54) FAST CORRELATION OF PROMETHEUS ORTHONORMAL SETS (PONS) FOR COMMUNICATIONS

(71) Applicant: Cisco Technology, Inc., San Jose, CA (US)

(72) Inventors: Knut Inge Hvidsten, Oslo (NO); Ragnvald Balch Barth, Oslo (NO)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 16/030,267

(22) Filed: Jul. 9, 2018

(51) Int. Cl.
*H04B 1/00* (2006.01)
*H04B 1/7093* (2011.01)
*H04B 1/06* (2006.01)

(52) U.S. Cl.
CPC ............. *H04B 1/7093* (2013.01); *H04B 1/06* (2013.01)

(58) Field of Classification Search
CPC ............................... H04B 1/7093; H04B 1/06
USPC ........................................................ 375/150
See application file for complete search history.

(56) References Cited

U.S. PATENT DOCUMENTS

| | | | |
|---|---|---|---|
| 5,142,656 A | 8/1992 | Fielder et al. |
| 5,184,316 A | 2/1993 | Sugiyama |
| 5,301,255 A | 4/1994 | Nagai et al. |
| 5,349,549 A | 9/1994 | Tsutsui |
| 5,357,594 A | 10/1994 | Fielder |
| 5,363,096 A | 11/1994 | Duhamel et al. |
| 5,394,473 A | 2/1995 | Davidson |
| 5,471,558 A | 11/1995 | Tsutsui |
| 5,479,562 A | 12/1995 | Fielder et al. |
| 5,506,623 A | 4/1996 | Sako et al. |
| 5,619,197 A | 4/1997 | Nakamura |
| 5,636,324 A | 6/1997 | Teh et al. |
| 5,913,186 A | 6/1999 | Byrnes et al. |
| 6,141,337 A | 10/2000 | Uta et al. |

(Continued)

FOREIGN PATENT DOCUMENTS

CN 104753561 A 7/2015

OTHER PUBLICATIONS

H. Delic, "The Prometheus Orthonormal Set for Wideband CDMA", IEEE MELECON 2004, May 12-15, 2004, Dubrovnik, Croatia, 4 pages.

(Continued)

*Primary Examiner* — Helene E Tayong
(74) *Attorney, Agent, or Firm* — Edell, Shapiro & Finnan, LLC

(57) ABSTRACT

An apparatus includes an input node, an output node, and successive butterfly elements connected between the input node and the output node. Each butterfly element includes a first branch and a second branch that are cross-coupled with each other and that perform, collectively, sample add and sample delay operations. Either the first branch or the second branch of each butterfly element performs a sample inversion, such that a pattern of the sample inversions across the butterfly elements encodes into the butterfly elements a pattern of negative and positive binary values of a particular row of a Prometheus Orthonormal Sets (PONS) matrix. As a result, the successive butterfly elements correlate input samples applied to the input node against the particular row of the PONS matrix as the input samples are shifted through the successive butterfly elements.

20 Claims, 14 Drawing Sheets

(56) References Cited

U.S. PATENT DOCUMENTS

| | | | |
|---|---|---|---|
| 6,985,516 B1* | 1/2006 | Easton | H04B 1/707 370/335 |
| 7,852,318 B2 | 12/2010 | Altman | |
| 8,212,854 B2 | 7/2012 | Marton et al. | |
| 8,259,603 B2 | 9/2012 | Kuroda et al. | |
| 10,003,377 B1 | 6/2018 | Ramalho et al. | |
| 2003/0043775 A1 | 3/2003 | Kikuchi | |
| 2004/0071195 A1 | 4/2004 | Huang et al. | |
| 2018/0175903 A1 | 6/2018 | Ramalho et al. | |

OTHER PUBLICATIONS

N. Ouyang, "Fast Algorithm for Walsh Hadamard Transform on Sliding Windows", IEEE Transactions on Pattern Analysis and Machine Intelligence, vol. 32, Issue 1, Jan. 2010, 16 pages.

Eric Jacobsen, "Understanding and Implementing the Sliding DFT", Anchor Hill Communications, www.anchorhill.com, Apr. 2015, 5 pages.

M. An, et al., "Pons, Reed-Muller Codes, and Group Algebras", Computational noncommutative Algebra and Applications, pp. 155-196, part of the NATO Science Series II: Mathematics, Physics and Chemistry book series, NAII, vol. 136), 2004, 42 pages.

A. la Cour-Harbo, "On the Rudin-Shapiro transformation", ScienceDirect, Appl. Comput. Harmon. Anal. 24 (2008) 310-328, www. sciencedirect.com, 19 pages.

T. Yoshioka, et al., "Making Machines Understand Us in Reverberant Rooms", [Robustness against reverberation for automatic speech recognition], Fundamental Technologies in Modern Speech Recognition, IEEE Signal Processing Magazine, Nov. 2012, 13 pages.

K.K. Wong, et al., "Spread Spectrum Techniques for Indoor Wireless IR Communications", Optical Wireless Communications, IEEE Wireless Communications, Apr. 2003, 11 pages.

H. Delic, et al., "The Prometheus Orthonormal Set for Wideband CDMA", IEEE MELECON 2004, May 12-15, 2004, Dubrovnik, Croatia, 4 pages.

* cited by examiner

| N | CONCATENATION (C1) | PONS MATRIX (C2) | ROW NAMES (C3) |
|---|---|---|---|
| 2 (R1) | | $\begin{array}{cc} + & + \\ - & + \end{array}$ | $A_2$ $B_2$ |
| 4 (R2) | $\begin{array}{cc} A_2 & B_2 \\ A_2 & -B_2 \\ B_2 & A_2 \\ -B_2 & A_2 \end{array}$ | $\begin{array}{cccc} + & + & + & - \\ + & + & - & + \\ + & - & + & + \\ - & + & + & + \end{array}$ | $A_4$ $B_4$ $C_4$ $D_4$ |
| 8 (R3) | $\begin{array}{cc} A_4 & B_4 \\ A_4 & -B_4 \\ B_4 & A_4 \\ -B_4 & A_4 \\ C_4 & D_4 \\ C_4 & -D_4 \\ D_4 & C_4 \\ -D_4 & C_4 \end{array}$ | $\begin{array}{cccccccc} + & + & + & - & + & + & - & + \\ + & + & + & - & - & - & + & - \\ + & + & - & + & + & + & + & - \\ - & - & + & - & + & + & + & - \\ + & - & + & + & - & + & + & + \\ + & - & + & + & + & - & - & - \\ - & + & + & + & - & - & + & + \\ + & - & - & - & + & - & + & + \end{array}$ | $A_8$ $B_8$ $C_8$ $D_8$ $E_8$ $F_8$ $G_8$ $H_8$ |

FAST CORRELATION OF PROMETHEUS ORTHONORMAL SETS (PONS) FOR COMMUNICATIONS

TECHNICAL FIELD

The present disclosure relates generally to correlation and, more particularly, to cross-correlation, with Prometheus Orthonormal Sets (PONS).

BACKGROUND

Code construction based on Prometheus Orthonormal Sets (PONS) has beneficial properties when applied to direct sequence spread spectrum (DSSS) communications. A spread spectrum receiver employs cross-correlation, to find a time lag corresponding to an absolute time delay between the receiver and a spread spectrum transmitter. The correlation represents a significant computational burden for a correlator processor in the receiver. Spread spectrum techniques typically trade a large spread spectrum spreading factor for low signal-to-noise ratio (SNR) at a given output power of the transmitter. Consequently, detecting a signal in the receiver using means other than correlation is difficult.

BRIEF DESCRIPTION OF THE DRAWINGS

FIG. 1 is an illustration of a method of constructing a code sequence based on a Prometheus Orthonormal Set (PONS), according to an example embodiment.

DESCRIPTION OF EXAMPLE EMBODIMENTS

Overview

Figure 2:
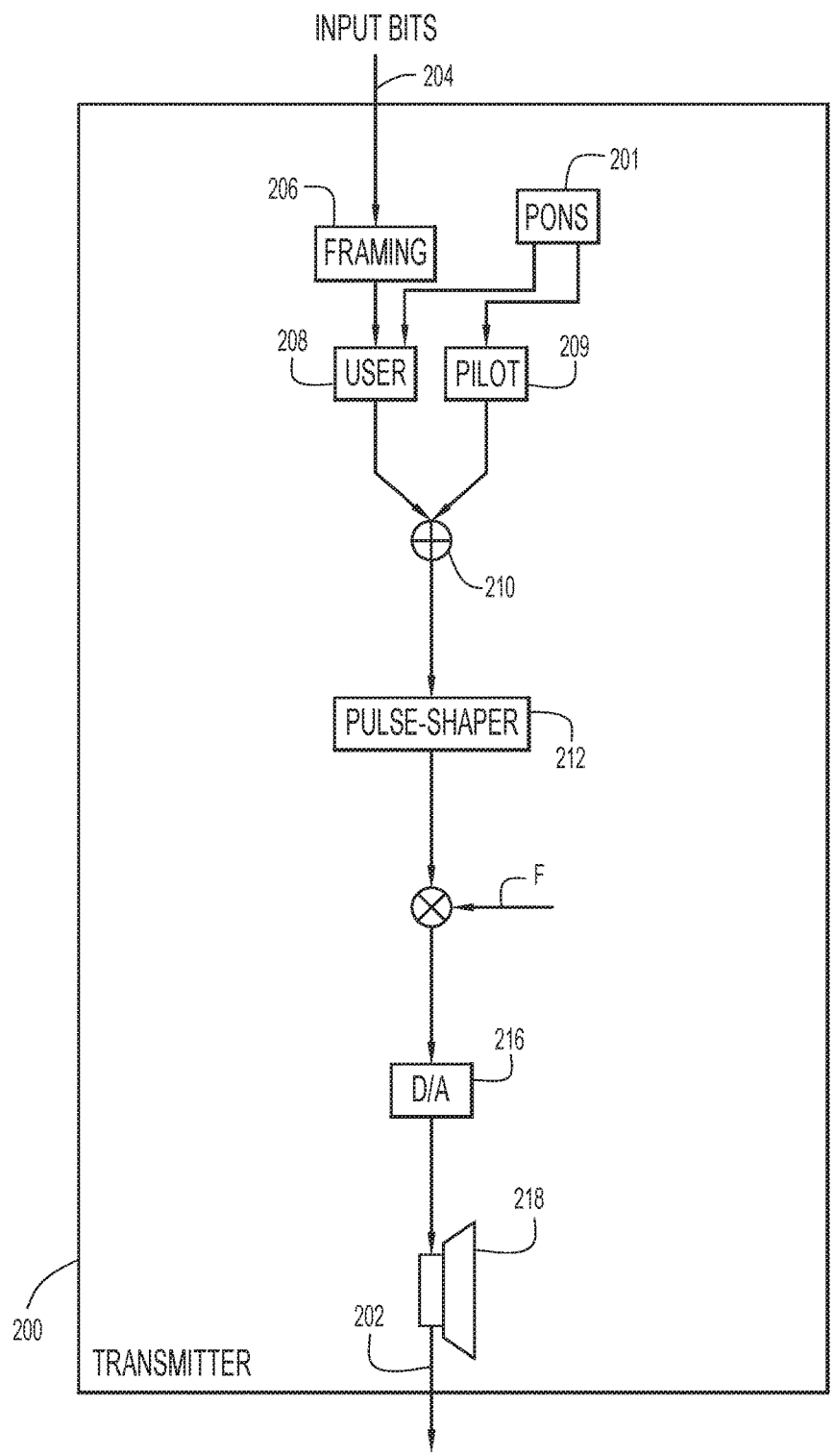
FIG. 2 is a block diagram of a spread spectrum acoustic transmitter in which a pilot sequence and symbols based on the PONS may be used, according to an example embodiment.

An apparatus includes an input node, an output node, and successive butterfly elements connected one to the next between the input node and the output node. Each butterfly element respectively includes a first branch and a second branch that are cross-coupled with each other and that are configured to perform, collectively, sample add and sample delay operations. Either the first branch or the second branch of each butterfly element is further configured to perform a sample inversion, such that a pattern of the sample inversions across the butterfly elements encodes into the butterfly elements a pattern of negative and positive binary values of a particular row of a Prometheus Orthonormal Sets (PONS) matrix. As a result, the successive butterfly elements are configured to correlate a sequence of input samples applied to the input node against the particular row of the PONS matrix as the input samples are shifted through the successive butterfly elements, to produce at the output node a sequence of correlation results indicative of whether a pattern of the input samples matches the pattern of negative and positive binary values of the particular row.

EXAMPLE EMBODIMENTS

With reference to FIG. 1, there is an illustration of a method of constructing a code sequence (i.e., a code) based on a Prometheus Orthonormal Set (PONS), i.e., a PONS construction. The PONS construction uses repetitive concatenation of relatively smaller PONS matrices to construct relatively larger PONS matrices. Each PONS matrix is a square matrix having an equal number of rows and columns. Each row represents a PONS code (also referred to simply as "PONS"). The PONS code includes a unique pattern of negative binary values "−" and positive binary values "+" having a dimension or width of N binary values. The method of FIG. 1 is an example of an N=8 PONS construction.

The method of FIG. 1 is illustrated as a table having table rows R1, R2, and R3 for successive PONS codes of increasing sizes N=2, N=4, and N=8. The table includes table columns C1, C2, and C3 to indicate a PONS dimension N for the PONS matrix for each table row, show which PONS rows of a smaller, previous PONS matrix are concatenated to construct the PONS matrix for each table row, and indicate labels identifying the PONS rows in the PONS matrix, respectively. The table shows construction of an 8×8 PONS matrix (i.e., an N=8 PONS matrix, shown in table row R3) from a 2×2 PONS matrix, with PONS rows $A_2$ and $B_2$ (i.e., an N=2 PONS matrix shown in table row R1). The construction includes concatenation and selective inversion of the two PONS rows $A_2$ and $B_2$ to form a 4×4 PONS matrix with PONS rows $A_4$, $B_4$, $C_4$ and $D_4$ (shown in table row R2). The four PONS rows are (again) concatenated and selectively inverted to form the 8×8 PONS matrix shown in table row 3. The aforementioned procedure may be applied repeatedly to create ever larger power-of-two PONS matrices. In the example of FIG. 1, each PONS matrix is symmetric, and is referred to as a symmetric PONS (sPONS) matrix. Embodiments presented below use sPONS matrices by way of example, only; however, methods can be adopted in a straight-forward manner for the non-symmetric PONS case.

With reference to FIG. 2, there is a block diagram of a transmitter 200 that uses PONS codes from a code memory 201 to generate a spread spectrum acoustic signal 202. Transmitter 200 receives a stream or sequence of digital bits 204. A framer 206 frames the bits into groups/frames of bits, and a user encoder 208 encodes the groups of bits into symbols represented as PONS codes from code memory 201. A pilot generator 209 generates a pilot sequence as a sequence of PONS codes from memory 201. An adder 210 combines and time-synchronizes the symbols with the pilot sequence to produce a combined, digitized baseband signal. A pulse-shaper/up-sampler 212 employs a root-raised cosine (RRC) filter to generate a digital baseband signal. An upconverter 214 frequency-upconverts the combined, digitized baseband signal based on a local oscillator frequency F, to produce a digitized, upconverted signal. A "real( )" operation discards imaginary components of the digitized, upconverted signal, leaving only real components of the signal. A digital-to-analog (D/A) 216 converts the digitized, upconverted signal to an analog upconverted signal, and an amplifier and loudspeaker 218 converts the aforementioned signal to acoustic signal 202 and transmits the acoustic signal. Acoustic signal 202 represents a spread spectrum acoustic signal including the synchronized symbols and pilot sequence encoded into the acoustic signal. Acoustic signal 202 may have a frequency spectrum in an audible frequency band of human hearing (e.g., up to 20 kHz), an ultrasound frequency band (e.g., above 20 kHz), or a frequency band that spans both the audible and the ultrasound frequency bands.

In an example, transmitter 200 uses PONS orders of $N_u=8$ for user codes (i.e., representing user symbols), and $N_p=4*N_u=32$ for a pilot code (i.e., pilot). Thus, pilot generator 209 generates a 32-element pilot sequence selected from one row of $PONS_{32}$, for instance a concatenation of rows $A_8$, $B_8$, $A_8$, and $-B_8$ from the $PONS_8$ matrix of FIG. 1, represented as:

$$Pilot_8 = (A_8, B_8, A_8, -B_8).$$

Also, user encoder 208 selects and outputs user symbols that convey information (bits), where the user symbols include an arbitrary sequence of PONS codes $C_8$, $D_8$, $E_8$, $F_8$, $G_8$ from the $PONS_8$ matrix in order to represent the information. The user symbols may be represented as:

User symbol$_8^i \in (\pm C_8, \pm D_8, \pm E_8, \pm F_8, \pm G_8, \pm H_8)$;

User symbol$_8^u \notin (A_8, B_8)$;

E.g., User symbol$_8^{1\cdots 4} = (D_8, G_8, F_8, E_8)$.

In the above example, the user codes avoid the two $PONS_8$ rows used in constructing the pilot, in order to keep pilot and user codes orthogonal within 8-element synchronized user-code projections, as well as enabling the cross-correlation properties that allows a correlator/peak detector/finder to obtain that synchronization.

Figure 3:
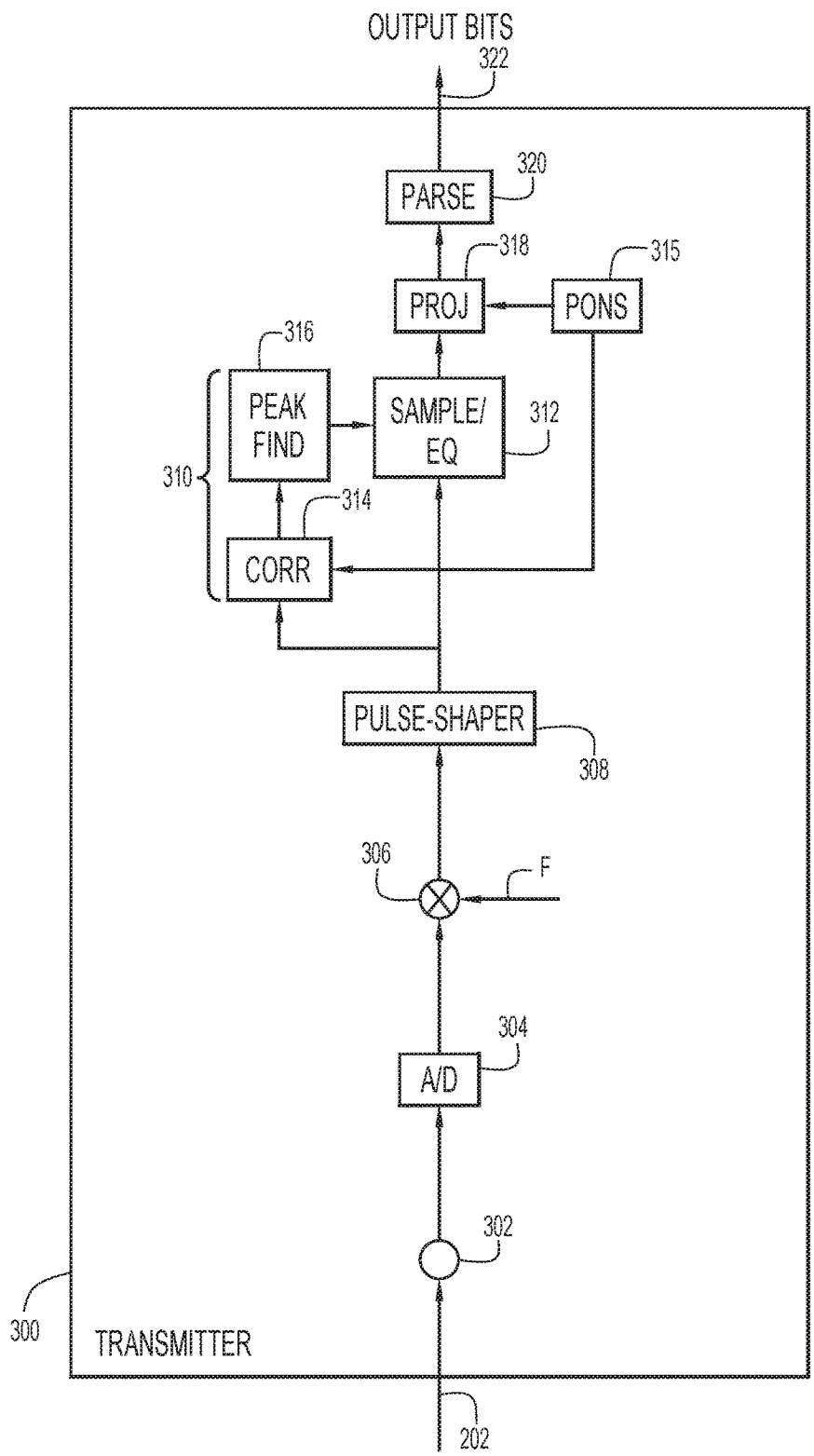
FIG. 3 is a block diagram of a spread spectrum acoustic receiver that receives and processes a spread spectrum acoustic signal using a PONS correlator to recover bits from symbols, according to an example embodiment.

With reference to FIG. 3, there is a block diagram of a receiver 300 that processes transmitted acoustic signal 202 to recover the bits from the symbols in the acoustic signal. Receiver 300 includes a microphone assembly 302 to detect the acoustic signal, an analog-to-digital (A/D) converter 304 to digitize the detected acoustic signal, and a down-converter 306 to frequency down-convert the digitized, detected acoustic signal based on a local oscillator frequency F, to produce a digitized baseband signal. A pulse shaper 308 filters the digitized baseband signal to produce a filtered version of the digitized baseband signal and provides samples thereof to a correlator assembly 310 and a sampler/equalizer 312.

In accordance with embodiments presented herein, correlator assembly 310 detects the pilot sequence in the digitized baseband signal to establish timing synchronization with the digitized baseband signal, which enables receiver 300 to demodulate the symbols in the digitized baseband signal. Correlator assembly 310 includes a PONS correlator 314 ("Corr") configured in accordance with embodiments presented herein, followed by a peak detector 316 ("peak find"). As will be described below, PONS correlator 314 is configured with a PONS code that matches (i.e., is a replica of) the PONS code of the pilot sequence (i.e., the PONS row or sequence of rows for the pilot sequence), and correlates sequential samples of the digitized baseband signal against the PONS code to produce sequential correlation results, i.e., correlation amplitudes. The PONS code may be stored as one of many possible PONS codes in a code memory 315 of receiver 300, and provided from the code memory to PONS correlator 314. Peak detector 316 detects peaks and their timing in the correlation results as time progress. The timing of the peaks represents a synchronization point to be used by receiver 300 to demodulate the symbols encoded into acoustic signal 202. That is, receiver 300 uses the peak magnitude timing for symbol timing recovery, and then demodulation of the symbols. An example sequence of correlation results produced by PONS correlator 314 is described below in connection with FIG. 13.

Sampler/equalizer 312 selects a subset of samples corresponding to one group/frame of samples and performs a complex phase rotation according to a peak magnitude and associated complex phase angle provided by correlator assembly 310, to produce spread spectrum chips. A projector 318 projects (e.g., using a dot product/inner product function) available PONS codes onto symbols of the digital baseband signal, picking the PONS row indexes that have the largest projection magnitude as estimates of the transmitted PONS row indexes, to decode the symbols into a demodulated stream of groups of bits. Parser 320 de-frames the bit stream to recover output bits 322 representative of input bits 204.

Transmitter 200 and receiver 300 are described above as transmitting, receiving, and processing acoustic signals by way of example, only. It is understood that embodiments presented herein may be used with transmitters and receivers that transmit, receive, and process at any frequency, signals that include acoustic waves propagated through any media, including air or other media, such as water, electromagnetic waves (e.g., radio), and signals stored or encoded on physical storage media, including memory magnetic hard drives and so.

In accordance with embodiments described below, PONS correlator 314 is configured to implement fast (e.g., $\log_2(N)$) correlation, e.g., cross-correlation, with reduced computational complexity compared to conventional correlations that employ multiply and add (accumulate) operations to correlate each of a sequence of input samples with each of a sequence or pattern of code samples. The embodiments encode into a structure of PONS correlator 314 a predetermined row of a PONS matrix to enable the correlator to correlate the input samples against the row of the PONS matrix in a computationally efficient manner.

First Embodiment of PONS Correlator

Figure 4:
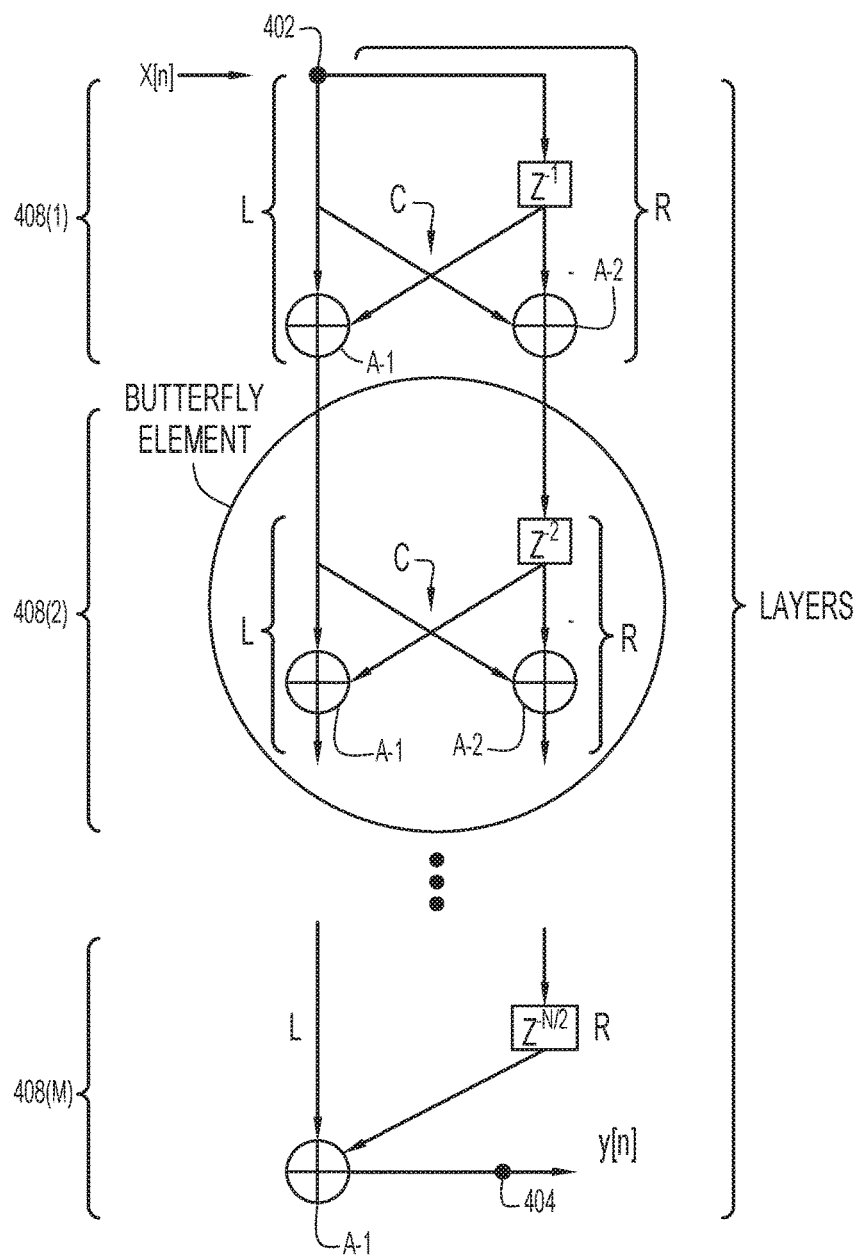
FIG. 4 is an illustration of a generalized structure of the PONS correlator, according to an example embodiment.

With reference to FIG. 4, there is an illustration of a generalized structure 400 of PONS correlator 314 (also referred to as "PONS correlator 400") that can be used to correlate an input x[n] against any particular row of a PONS matrix of any power of two size N, to produce correlation results y[n], according to a first embodiment. The function elements/components depicted in structure 400 also represent a method of correlating input x[n] against the particular row using the structure, to produce correlation results y[n].

Structure 400 includes an input node 402 to receive a sequence of input samples x[n], an output node 404 to produce correlation results y[n], and successive layers of butterfly elements 408(1)-408(M) (collectively referred to as "butterfly elements 408") each connected one to the next between the input node and the output node. Each butterfly element 408(i) represents a computational element for processing samples, as described below. Specifically, input node 404 is connected to an input of butterfly element 408(1) (the first butterfly element) and an output of butterfly element 408(M) (the last butterfly element) is connected to output node 404. In the first embodiment, each layer of PONS correlator 400 (i.e., structure 400) includes a single butterfly element 408(i).

At a high-level, each butterfly element 408(i) (e.g., butterfly element 408(2)) respectively includes a left branch L (also referred to as a "first branch L") and a right branch R (also referred to as a "second branch R") that are cross-coupled with each other as indicated at C in FIG. 4 and that are configured to perform, collectively, sample add operations (indicated in FIG. 4 by circles encircling a "+" sign) and programmable sample delay operations (indicated in FIG. 4 by rectangles including a "z"). Generally, left branch L and right branch R receive their respective inputs from respective outputs of a previous left branch L (i.e., from a previous butterfly element) and from a previous right branch R. Also, either left branch L or right branch R of each butterfly element 408(i) is selectively configured to perform a sample inversion (each indicated in FIG. 4 by "−" sign prior to an add operation). That is, the sample inversion is mutually exclusive between the two branches of each butterfly element 408(i).

In accordance with embodiments presented herein, a unique pattern of sample inversions of the left branch L and the right branch R across all of successive butterfly elements 408 results in an encoding into the successive butterfly elements of a unique pattern of negative and positive binary values of/for a particular row of a PONS matrix, i.e., a PONS code. Thus, given that encoding, successive butterfly elements 408 are configured to correlate input samples applied to/received by input node 402 x[n] against the particular row of the PONS matrix as the input samples are shifted through the successive butterfly elements, to produce at output node 404 correlation results indicative of whether a pattern of the input samples matches the pattern of negative and positive binary values of the particular row of the PONS matrix, as encoded into the butterfly elements according to the unique pattern of sample inversions. In the example of FIG. 4, the correlation results represent a functional equivalent of regular cross-correlation results produced with substantially reduced arithmetic complexity compared to conventional/standard cross-correlation results produced in a conventional correlator structure, for example, in a correlator structure in which input samples are shifted through a register of multiple sample storage elements and, at each shift, performs a multiply operation of each sample in the register against a corresponding code value, and then adds all of the multiply results into a correlation result (thus implementing a conventional sliding window correlator). That is, the structure of FIG. 4 produces the correlation results with substantially reduced arithmetic complexity compared to the conventional correlator.

With a few exceptions noted below, each butterfly element 408(i) includes left branch L and right branch R. Left branch L and right branch R are connected to a previous left branch L and a previous right branch R (of a previous butterfly element) so that left branch L and right branch R receive their respective inputs from respective outputs of a previous left branch L and a previous right branch R, respectively. Also: left branch L includes a first adder A-1 connected between an input of the left branch and an output of the left branch; (ii) right branch R includes a programmable sample delay unit/element z (e.g., a programmable power of 2 sample delay unit) connected in series with (i.e., followed by) a second adder A-2, such that the sample delay unit (also referred to more simply as a "delay unit") and the second adder are connected in series between an input to the right branch and an output of the right branch; and (iii) cross-coupling C is configured such that an output of delay unit z feeds an input to adder A-1, and the input to left branch L feeds an input to adder A-2. The exceptions to the above configuration include: (i) in first butterfly element 408(1), both left branch L and right branch R receive input sequence x[n] as inputs; and (ii) second adder A-2 of last butterfly element 408(N) is omitted so that delay unit z feeds adder A-1 in the last butterfly element.

In FIG. 4, each sample inversion in butterfly element 408(i) is represented as a minus sign "−" applied to an input of either adder A-1 in left branch L or an input to adder A-2 in right branch R. In one example, a given adder (either A-1 or A-2) in a given butterfly element may be re-configured as a subtractor to implement the indicated sample inversion. Alternatively, a sample inverter to perform the sample inversion may be inserted in the given left branch L or right branch R prior to the given adder to implement the indicated sample inversion prior to the adder. Thus, each butterfly element 408(i) is configured in either (i) a first arrangement in which right branch R performs the sample-inversion, but left branch L does not perform the sample arrangement, or (ii) a second arrangement in which left branch L performs the sample inversion, but right branch R does not perform the sample inversion. For example, in both butterfly elements 408(1) and 402(2) respective right branches R perform sample inversions.

Operationally, when a given butterfly element 408(i) is configured in the first arrangement:

a. Left branch L is configured to receive a first sample output by a previous left branch L (i.e., previous L), and add the first sample to a delayed sample from right branch R, to produce a first output sample to be provided as a next first sample to a next left branch (i.e., next L); and b. Right branch R is configured to receive a second sample output by a previous right branch R (i.e., previous R), delay the second sample to produce the delayed sample, invert the delayed sample, and add the inverted delayed sample to the first sample to produce a second output sample to be provided as a next second sample to a next right branch R (i.e., next R).

Alternatively, when the given butterfly element 408(*i*) is configured in the second arrangement:
  a. Left branch L is configured to receive first sample output by a previous left branch L (i.e., previous L), invert the first sample, and add the inverted first sample to a delayed sample from right branch R to produce a first output sample to be provided as a next first sample to a next left branch L (i.e., next L); and
  b. Right branch R is configured to receive a second sample output by a previous right branch R (i.e., previous R), delay the second sample to produce the delayed sample, and add the delayed sample to the first sample, to produce a second output sample to be provide as a next second sample to a next right branch R (i.e., next R).

The number of successive butterfly elements 408 of correlator 400 depends on the width N of the PONS row encoded into the PONS correlator 400. Where $N=2^x$ (x is an integer), the number of successive butterfly elements, M, is given by $M=\log_2 N$. Thus, M is less than the width N of the PONS row. Also, the programmable delay unit z implements a delay that increases by a factor of 2 for each successive butterfly element, beginning with a 1-sample delay at butterfly element 408(1). An advantage of correlator 400 is that butterfly elements 408(*i*) do not perform any multiplies, i.e., there are no multiplies in either branch of each butterfly element, which reduces computational complexity.

As mentioned above, the specific pattern of sample inversions programmed into the first/left and second/right branches L, R of successive butterfly elements 408(1)-402(N) encodes a width N PONS code into structure 400, against which input sample are correlated. A method of determining placement of the sample inversions (i.e., whether to program either left branch L or right branch R) in each of successive butterfly elements 408 is now described in connection with FIGS. 5-8.

$$PILOT_8 = (A_8, B_8, A_8, -B_8)$$

$$USER\ SYMBOL_8^i \in (\pm C_8, \pm D_8, \pm E_8, \pm F_8, \pm G_8, \pm H_8)$$

$$USER\ SYMBOL_8^i \notin (A_8, B_8)$$

$$USER\ SYMBOL_8^{1\cdots 4} = (D_8, G_8, F_8, E_8)$$

Figure 5:
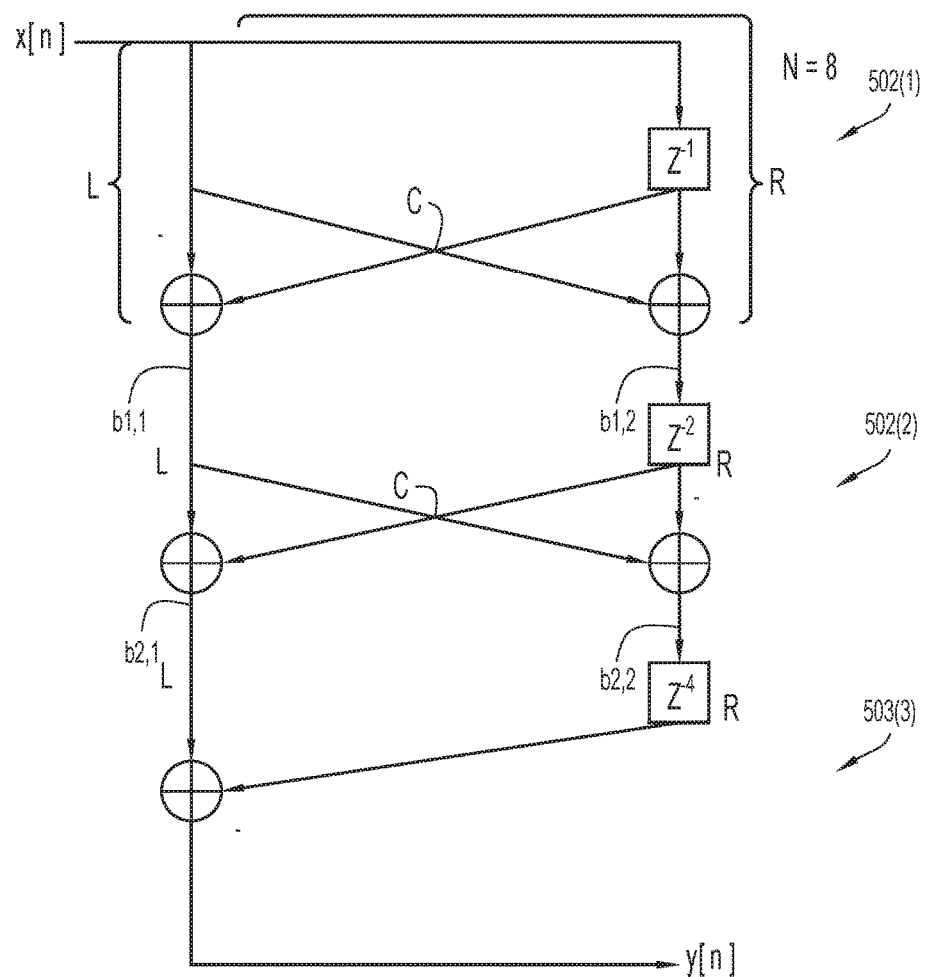
FIG. 5 is an illustration of a structure of a PONS correlator configured to correlate an input sequence against a PONS code having width N=8, according to an example embodiment.

With reference to FIG. 5, there is an illustration of a structure 500 of PONS correlator 314 configured to correlate an input sequence against a PONS code having N=8, according to the first embodiment. That is, structure 500 is an N=8 PONS correlator, according to the first embodiment. In the example of FIG. 5, the PONS code to be encoded into structure 500 is row 3, $C_8$, of the N=8 PONS matrix from FIG. 1 (see table row R3 of FIG. 1).

Given that N=8, structure 500 includes $\log_2(8)=3$ successive butterfly elements 502(1)-502(3) connected sequentially. The delay value of each sample delay z increase by a factor of 2 for each successive butterfly element.

From the N=8 PONS matrix, row 3, $C_8$:

$$C_8 = [++-++++-].$$

The proposed structure is linear and time-invariant (LTI), thus it is fully described by its impulse response. Because a (real) correlation is a time-reversal of convolution, the system impulse response $h_8$ (i.e., the impulse response of structure 500) should be a time-reversal of row 3, $C_8$, giving:

Desired impulse response $h_8=h[0]..h[7]=[-++++-++]$, where each successive element/value h[i] (equal to either "−" or "+") of the impulse response (from left-to-right] is delayed by 1-sample delay with respect to the previous element, and where the first element h[0] has a zero delay.

So, the method determines placement of sample inversion in each left branch L and each right branch R so that impulses traversing paths through the butterfly elements 502(1), 502(2), and 502(3) experience a pattern of sample inversions that results in the desired impulse response $h_8$ that is a time reversal of the row of the PONS matrix against which correlations are to be made.

The impulse responses at output nodes of first branches L and right branches R as shown in FIG. 5 are:
  {b1,1}: −+ (0 delay, then 1-sample delay)
  {b1,2}: ++
  {b2,1}: −+++
  {b2,2}: −+−−

Finally, output y(n) is given by:
  y[n]: [−++++−++], which is a sequence of elements/values (referred to as "impulse response elements" or simply "elements") of the actual impulse response of the correlator when the sample inversions of the butterfly elements are configured to encode $C_8$ into the butterfly elements.

A method of determining where to place the sample inversions (e.g., inverters) in either left branch L or right branch R of each butterfly element to achieve the above actual impulse response is further described in connection with FIGS. 6-8. The method traces pairs of impulse responses through structure 500. The method makes $\log_2(N)+1$ decisions (four in this case), a first to place an inverter (i.e., sample inversion) in first butterfly element 502(1), a second to place an inverter in second butterfly element 502(2), a third to place an inverter in third butterfly element 502(3), and a fourth to determine whether to invert the final output. Because only 4 decision are made, it is unnecessary to test all elements of the impulse response. Rather, only elements having Path1 that traces through the left-side only (no delays) and Path2 that traces through the same path, except diverging into the right-side branch of exactly one butterfly, for each butterfly as described below.

For an input including a single, positive impulse, each element of the desired impulse response can travel only in one specific path along the structure/topology. This property is exploited by comparing two sets of paths, "Path1" and "Path2," through the structure to see if their signs are equal or different, and by comparing their respective impulse response elements to see if those are equal or different. By moving the (mandatory) inverter to the left branch L of the "current" butterfly element, the relative polarity of Path1 vs. Path2 is flipped, if their relative polarity does not match the relative polarity of the corresponding impulse response elements. Otherwise, we move the inverter to the right branch of the current butterfly element. By convention, the method starts with first butterfly element 502(1), setting its parameters correctly (i.e., the placement of the inverter), then moving successively down the structure setting parameters for one butterfly element at a time as described next.

Figure 6:
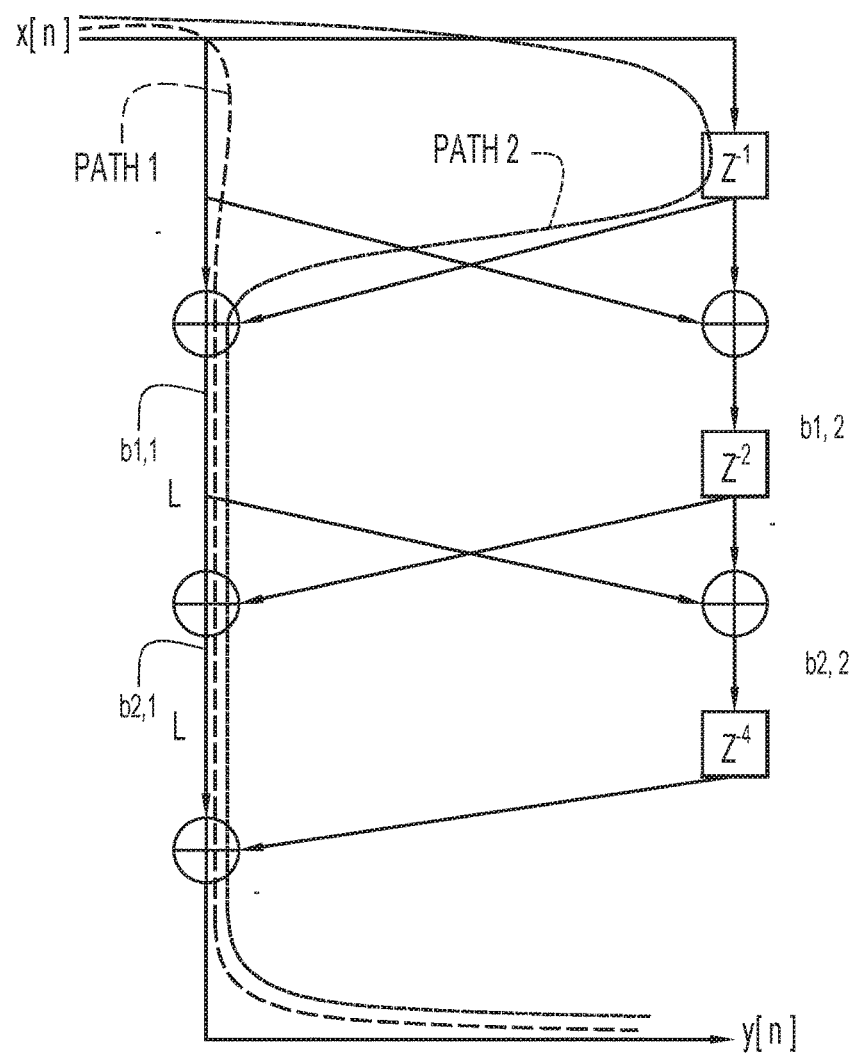
FIG. 6 is an illustration of processing paths for first and second elements of an impulse response in the PONS correlator of FIG. 5, according to an example embodiment.

With reference to FIG. 6, there is an illustration of Path1 and Path2 for first and second elements of the impulse response. It is desired that the first and second elements of the impulse response be "−" and "+", which have opposite polarity. Thus, the method places an inverter on left branch L of first butterfly element 502(1), to (temporarily) yield h[0]=−, h[0]=+.

Figure 7:
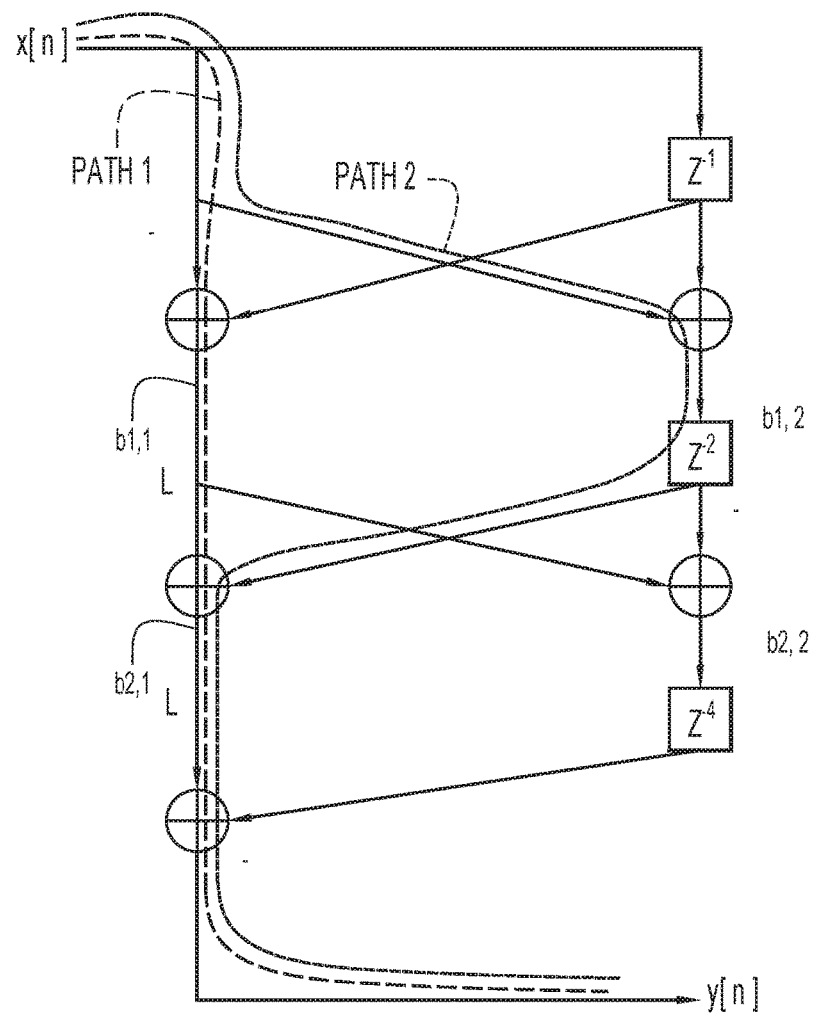
FIG. 7 is an illustration of processing paths for a first and third element of an impulse response in the PONS correlator of FIG. 5, according to an example embodiment.

With reference to FIG. 7, there is an illustration of Path1 and Path2 for the first and third elements of the impulse response. It is desired that the first and third elements of the impulse response be "−" and "+", which have opposite polarity. Since an inverter has already been placed in left branch L of first butterfly element 502(1), Path1 and Path2 also have opposite polarity. Accordingly, the method places an inverter on right branch R of butterfly element 502(2).

Figure 8:
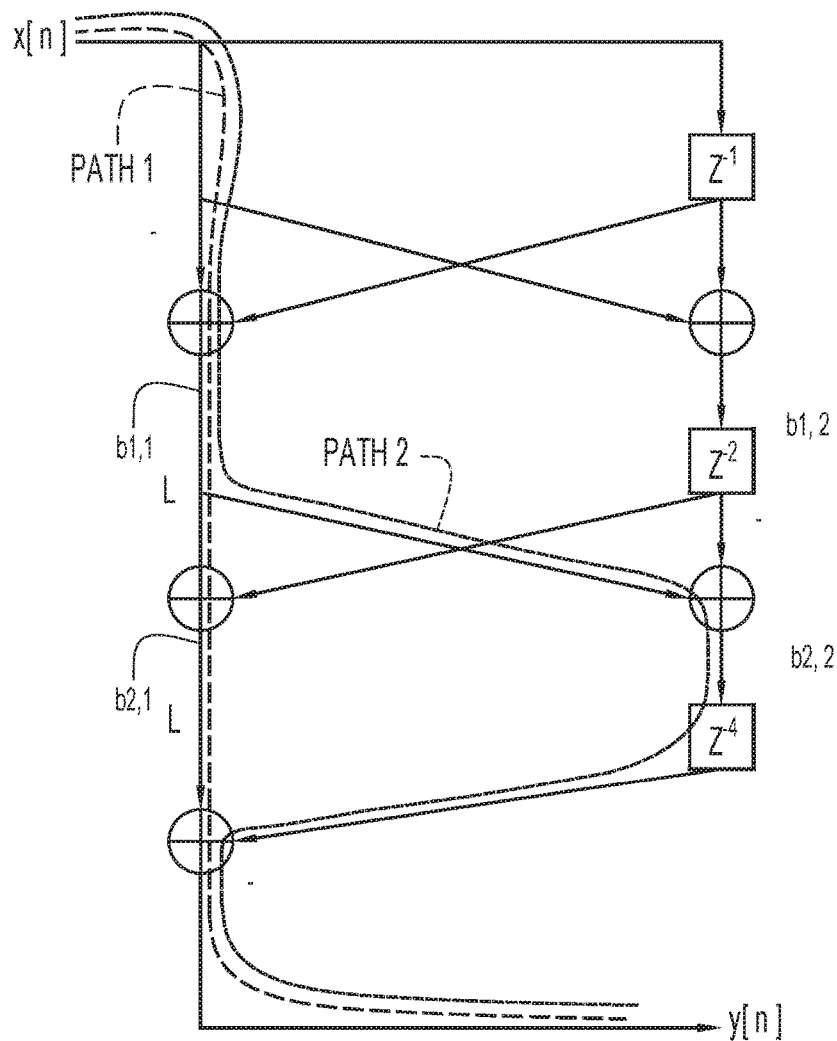
FIG. 8 is an illustration of processing paths for a first and fifth element of an impulse response in the PONS correlator of FIG. 5, according to an example embodiment.

With reference to FIG. 8, there is an illustration of routes Path1 and Path2 for the fifth element "+" of the impulse response. It is desired that the first and fifth element of the impulse response be "−" and "+", which have opposite polarity. Since the inverter was placed to the right in the second butterfly (502(2)), Path1 and Path2 have the same polarity. To compensate for this, the method places the inverter of the final butterfly 502(3) so as to invert the path1 signal path.

Finally, the method checks the absolute polarity of the h[0] impulse response element. If it has the incorrect polarity, the method places an inverter at the final output y[n], which is needed in structure 500.

Note that the operation (−path1+path2)*−1 can be replaced by path1−path2, as is suggested in FIG. 8 to reduce the operation to a single subtraction.

A summary method of constructing and configuring a PONS correlator to correlate an input signal against a PONS code, according to the first embodiment includes:
  a. Choosing a number M of layers, i.e., M vertically stacked butterfly elements as shown in FIGS. 4 and 5, for example, where $M=\log_2(N=2^x)$, where N is the width of the PONS code/row from a PONS matrix to be encoded into the butterfly elements, and x is an integer.
  b. Inserting one butterfly element per layer for all layers except a final layer. Inserting a partial butterfly element in the final layer.
  c. Setting a delay value of a delay unit in each butterfly element of layer (i+1) to 2 times a delay value of layer (i), starting at delay=1.
  d. Interconnecting the two output nodes of each butterfly element to respective ones of the two input nodes of the next layer (i.e., butterfly element).
  e. Selectively inverting one branch of each butterfly element depending on the desired PONS row to encode/correlate against.
  f. Terminating the final butterfly element by only one branch, possibly inverting its output.

The embodiments described may be used with a real input including samples from an arbitrary row of a PONS matrix of any power-of-two size; however, the embodiments may also be applied to a complex baseband suitable for quadrature modulation, as described in connection with FIGS. 2 and 3. In an example, converting real PONS elements into a complex baseband representation includes alternately interleaving N odd and even elements into an N/2 complex vector/stream. For example, a first row of an N=8 PONS, has the following real elements:

$PONS_8(1)=[+1\ +1\ +1\ -1\ +1\ +1\ -1\ +1]$.

The first row corresponds to the following complex baseband pilot including 4 complex chips:

Pilot=[1+$i$,1−$i$,1+$i$,−1+$i$], where $i$ is the imaginary unit for which $i^2=-1$ In transmitter 200, user encoder 208 and pilot generator 209 convert from real PONS elements to interleaved complex baseband. In receiver 300, projector 318 performs the corresponding inverse operation to convert any complex element [X+i*Y] to two real elements [X, Y] in a serial stream.

Also, complex correlation may be substituted by complex convolution, as long as the set of coefficients encoded into the complex correlator are time-reversed and conjugated, as follows:

Complex impulse response=[−1−$i$,1−$i$,1+$i$,1−$i$] (4 complex chips).

Figure 14:
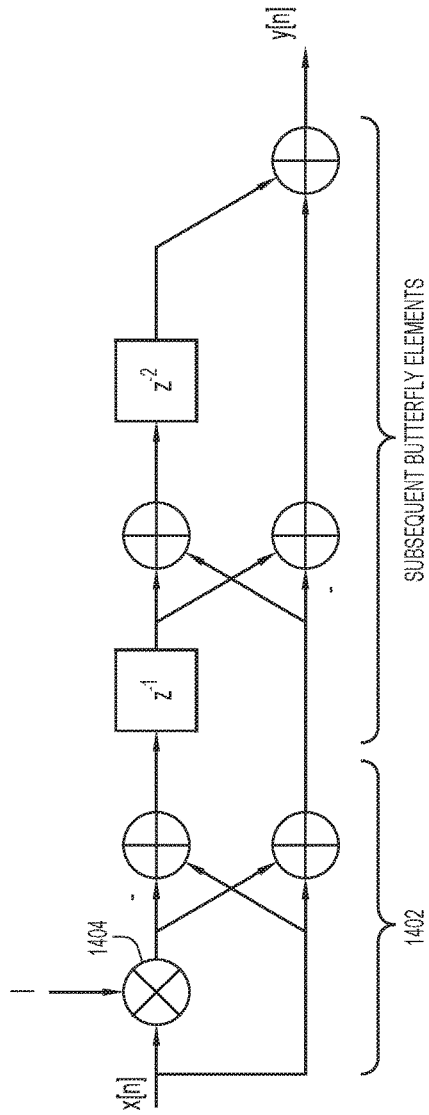
FIG. 14 is an illustration of a structure of the PONS correlator that represents a complex PONS correlator, according to an example embodiment.

Thus, the embodiments described above for correlating against a row of the PONS matrix may also be used for the complex baseband case with only minor modification, as shown in FIG. 14.

With reference to FIG. 14, there is an illustration of an example structure 1400 of PONS correlator 314 configured as a complex correlator to operate with the complex pilot and the complex impulses response corresponding to $PONS_8$ (1) (4 complex chips), as described above. FIG. 14 also shows a table having PONS row elements in the first column, corresponding complex correlator template elements p in the second column, and corresponding complex convolutional coefficients h in the third column, where each coefficient h is the time-reversal and conjugate of the corresponding correlator template element p. For example, for row elements r1-r8, then p1-p4 represent the (complex) correlator template, where p1=r1+i*r2, p2=r3+i*r4, and so on. Then, h1-h4 represent the corresponding (complex) convolution coefficients, i.e. the time-reversal and conjugate form of p1-p4, where h1=conj(p4), h2=conj(p3), and so on.

Structure 1400 includes a first butterfly element 1402 that includes a complex multiplier 1404 to perform complex multiplication by the imaginary number, i, in place of a delay unit. Subsequent butterfly elements include the usual delay units to implement 1-delay, 2-delay, and so forth, as described in the previous embodiments. Also, all real additions, subtractions, and delay units are replaced by their complex counterparts. The previous embodiments/methods described above for placing the inverters may be used in the complex correlator without modification.

Second Embodiment of PONS Correlator

Figure 9:
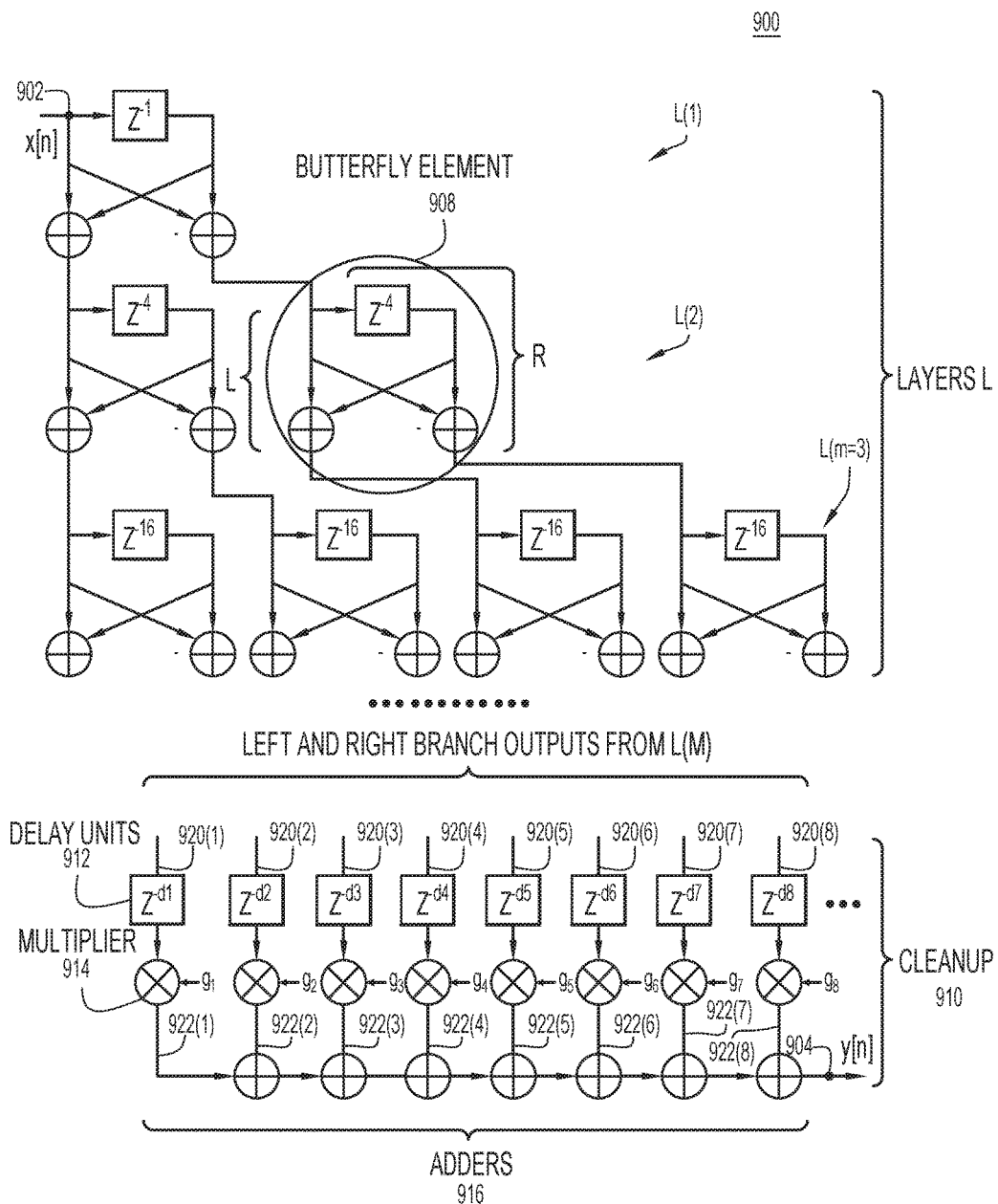
FIG. 9 is an illustration of a generalized structure of the PONS correlator, according to an example embodiment.

With reference to FIG. 9, there is an illustration of a generalized structure 900 of PONS correlator 314 (also referred to as "PONS correlator 900") that can be used to correlate input x[n] against any particular row of a PONS matrix of any power of two size N, to produce correlation results y[n], according to a second embodiment. Structure 900 also represents a method of correlating input x[n] against the particular row using the structure, to produce correlation results y[n].

Structure 900 includes: an input node 902 to receive the sequence of input samples x[n]; an output node 904 to produce correlation results y[n]; successive layers L(1)-L(M) of repeated butterfly elements 908 increasing in number in each successive layer from top layer L(1) including one butterfly element coupled to the input node down to bottom layer L(M); and an output or "cleanup" stage 910, coupled to outputs of the butterfly elements in the bottom layer (referred to as "bottom layer outputs"), to apply to each of at least some of the bottom layer outputs a respective sample delay followed by a respective gain/weight, to produce a respective delayed weighted value, and to sum the delayed weighted values into the correlation results y[n] at output node 904. The sample delays and the gains of cleanup stage 910 are configured based on a pattern of negative and positive binary values of a particular row of a PONS matrix, such that structure 900 is configured to correlate input samples x[n] against the row of the PONS matrix as the input samples are shifted through successive layers L(1)-L(M) and cleanup stage 910, to produce correlation results y[n] at output node 904.

The number of layers, M, of butterfly elements 908 is given by M=floor($\log_2$(N/2)). Beginning with one butterfly element 908 in first layer L(1), the number of butterfly elements doubles in each successive layer, i.e., layer L(i+1) has twice as many butterfly elements as layer L(i). Each butterfly element 908 includes a programmable delay unit z, which has a delay value that is the same for all butterfly elements in a given layer L(i), but that increases down the layers L(1)-L(M). Specifically, the delay value of delay unit z employed by butterfly elements 908 of layer L(i+1) is 4 times the delay value of delay unit z employed by butterfly elements of layer L(i), starting with a delay value of 1 in layer L(1).

Each butterfly element 908 is configured similarly to butterfly element 408(2) described in connection with FIG. 4. That is, each butterfly element 908 includes a left branch L and a right branch R that are cross-coupled with each and configured as described above; however, in butterfly element 908, left branch L and right branch R have their respective inputs tied to the same input node. Also, consistent across all butterfly elements 908, right branch R of each butterfly element includes a sample inversion, while the left branch L of each butterfly element does not include the sample inversion (similar to the "first arrangement" of the butterfly element described above in connection with FIG. 4). Operationally, left branch L receives an input sample and adds the input sample to a delayed input sample from right branch R to produce a left branch L output sample. Right branch R inverts the input sample, delays the input sample to produce the delayed sample, and then adds the inverted input sample to the delayed sample to produce a right branch R output sample. In each layer L(i), each butterfly element 908 provides the left branch output and the right branch output to respective inputs of different butterfly elements occupying next layer L(i+1), such that each butterfly element 908 includes only one input, which is tied to a respective output of a butterfly element in the previous layer. Note that the structure up until this point only depends on the PONS order, N, not the desired PONS row to correlate against.

Cleanup or output stage 910 includes a row of programmable delay units 912 that implement sample delays $z^{-d1}$- $z^{-d8}$ as shown, a row of multipliers 914 following the delay units and to apply gains or weights $g_1$-$g_8$ as shown (where $g_i$=+1, −1, or 0), and a row of adders 916 following the multipliers. Using delay units 912, multipliers 914, and adders 916, cleanup stage 910 applies to each of at least some of the left and right branch outputs from bottom layer L(M) of the butterfly elements a respective sample delay (via delay units 912) followed by a respective gain or weight (via multipliers 914), to produce delayed, weighted values, and then sums (via adders 916) all of the delayed, weighted values to produce correlation results y[n]. For example, cleanup stage (i) delays a first output 920(1) (among outputs 920(1)-920(8) from bottom layer L(M) by delay $z^{-d1}$ and multiplies the delayed result by gain/weight $g_1$, to produce a first delayed, weighted output 922(1) (among weighted outputs 922(1)-922(8)), (ii) delays a second output 920(2) from bottom layer L(M) by delay $z^{-d2}$ and multiplies the delayed result by gain/weight $g_2$, to produce a second delayed, weighted output 922(2), and so on. Then, adders 916 add together the first delayed, weighted output 922(1), the second delayed, weighted output 922(2), and so on, to produce correlation result y[n].

Constructing structure 900 and performing a generalized method of calculating a PONS correlation using the structure includes:

a. Choosing a number, M, of layers of vertically stacked butterflies, where:

$M$=floor($\log_2$(N)/2), where $N=2^x$, and $x$ is an integer.

b. Setting the number of butterfly elements for layer L(i+1) to twice that of layer L(i).
c. Setting the delay value of each delay unit in each butterfly element of layer L(i+1) to 4 times the value of layer L(i), starting with a delay value=1 for layer L(1).
d. Interconnecting butterfly elements between layers as shown in FIG. 9, i.e., connecting each of the outputs of the previous layer L(i) to one input of the next layer L(i+1).
e. If N is an even power of 2 (x is even), all outputs of the final/bottom layer L(M) are delayed and summed in the cleanup. If N is an odd power of 2 (i.e., x is an odd power of 2), only half of the final layer outputs are used for either even or odd PONS rows (and thus the final layer can be simplified by pruning).
f. Delays di and gains $g_i$ in the summation of the cleanup are found by aligning branch impulse responses using the method described below in connection with FIG. 10.

Figure 10:
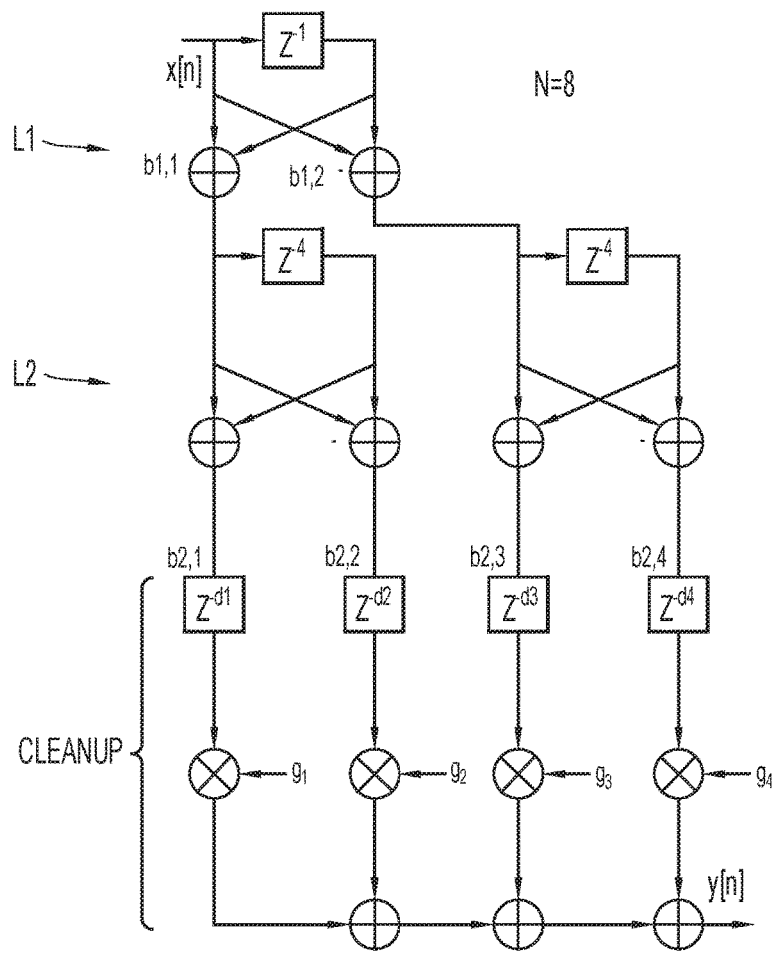
FIG. 10 is an illustration of a structure of a PONS correlator configured to correlate an input sequence against a PONS code having width N=8, according to an example embodiment.

With reference to FIG. 10, there is an illustration of a structure 1000 of PONS correlator 312 configured to correlate an input sequence against a PONS code having N=8, according to the second embodiment. That is, structure 1000 is an N=8 PONS correlator, according to the second embodiment. In the example of FIG. 10, the PONS code to be correlated against is row 1, $A_8$, of the N=8 PONS matrix from FIG. 1 (see last table R1 of FIG. 1). A method for determining delays values and gain values for the cleanup stage of structure 1000 using impulse responses of the structure is described below.

The method recognizes that the impulse response at each output branch of the butterfly elements (i.e., impulse responses at {b1,1}, {b1,2}, and so on) should assemble to match a desired overall correlation operation. The method achieves that match by adjusting delays d1-d4 and gains $g_1$-$g_4$.

From FIG. 1, row 1, $A_8$, of the N=8 PONS matrix is $A_8$=[+++−++−+].

Because a (real) correlation is a time-reversal of convolution, the system impulse response (i.e., the impulse response of structure 1000) should be a time-reversal of row 1, $A_8$, giving: Desired impulse response $h_8$=h[0]..h[7]= [+−++−+++].

The partial impulse responses before the cleanup stage are:

{b2,1}: ++00++
{b2,2}: −−00++
{b2,3}: −+00−+
{b2,4}: +−00−+

The method recognizes that adding {b2,1} delayed by 2 samples to {b2,4} is sufficient to achieve the desired system impulse response:

[++00++] ({b2,1} delayed by 2)
+[+−00−+] ({b2,4})
=[+−++−+++] (actual impulse response)

Thus, the method discards {b2,2} and {b2,3}.

This same approach may be used for any row index and any PONS size. The value of each $g_i$ will be either +1, −1 or 0, thus it is not a general multiplication, but rather a selective inversion/no-inversion, or discarding of the branch. As the choice of PONS row to correlate against may be predetermined, it is expected that a designer/implementer may exploit this to prune the structure.

Example Processor

Figure 11:
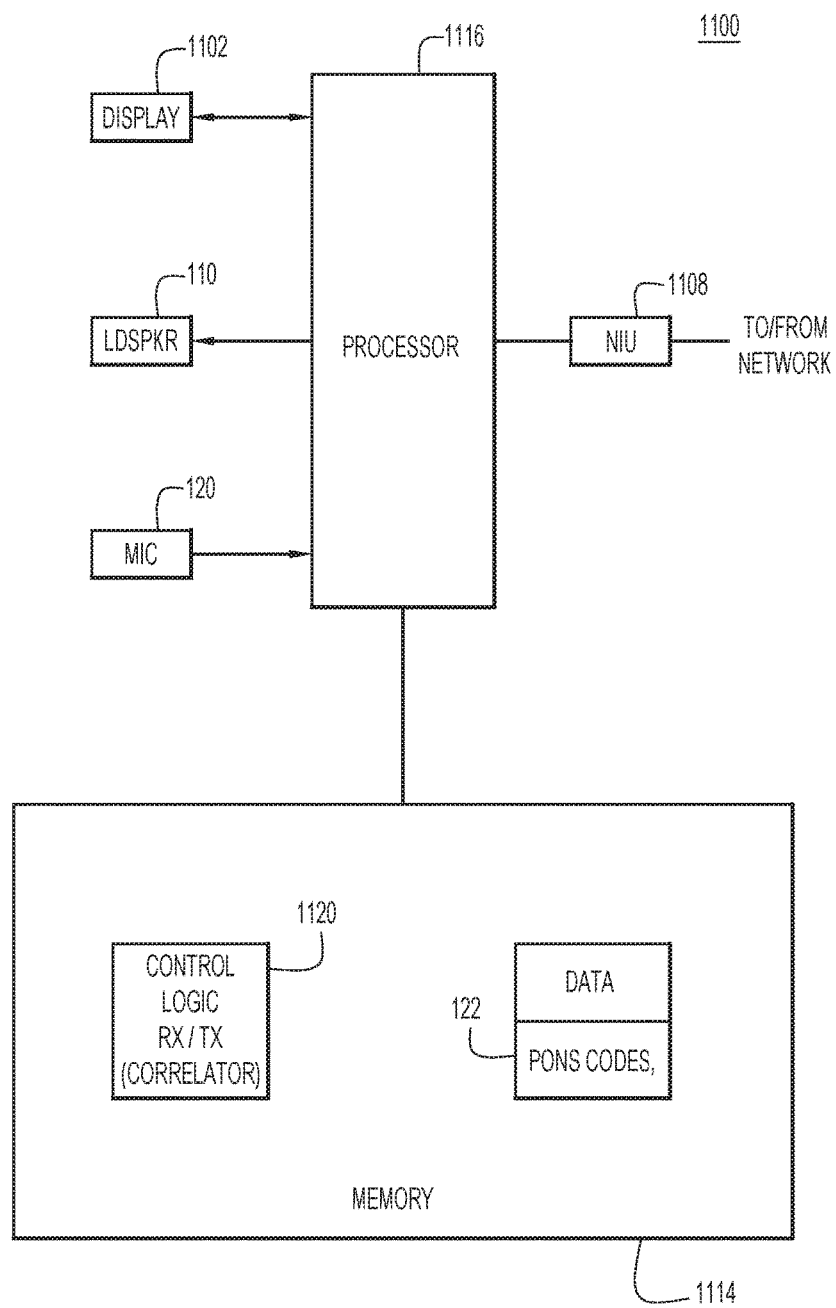
FIG. 11 is a block diagram of a communication device in which the spread spectrum acoustic transmitter and the spread spectrum acoustic receiver, and the PONS correlator, may be implemented, according to an example embodiment.

With reference to FIG. 11, there is a block diagram of an example communication device 1100 in which transmitter 200, receiver 300, or both may be implemented. There are numerous possible configurations for device 1100 and FIG. 11 is meant to be an example. Examples of device 1100 include a tablet computer, a personal computer, a laptop computer, a mobile phone, such as a smartphone, or a video conference endpoint. Device 1100 may include a display 1102, loudspeaker 218, microphone 302, one or more network interface units (NIUs) 1108, and memory 1114 each coupled to a processor 1116. The one or more NIUs 1108 may include wired and/or wireless connection capability that allows processor 1116 to communicate over a communication network. For example, NIUs 1108 may include an Ethernet card to communicate over an Ethernet connection, a wireless RF transceiver to communicate wirelessly with cellular networks in the communication network, optical transceivers, and the like, as would be appreciated by one of ordinary skill in the relevant arts.

Processor 1116 may include a collection of microcontrollers and/or microprocessors, for example, each configured to execute respective software instructions stored in the memory 1114. Processor 1116 may be implemented in one or more programmable application specific integrated circuits (ASICs), firmware, or a combination thereof. The collection of microcontrollers may include, for example: a video controller to receive, send, and process video signals or images related to display 1102; an acoustic processor to receive, send/transmit, and process acoustic/sound signals related to loudspeaker 218 and microphone 302 as described herein; and a high-level controller to provide overall control. Portions of memory 1114 (and the instructions therein) may be integrated with processor 1116. As used herein, the terms "acoustic" and "sound" are synonymous and interchangeable.

The memory 1114 may include read only memory (ROM), random access memory (RAM), magnetic disk storage media devices, optical storage media devices, flash memory devices, electrical, optical, or other physical/tangible (e.g., non-transitory) memory storage devices. Thus, in general, the memory 1114 may comprise one or more computer readable storage media (e.g., a memory device) encoded with software comprising computer executable instructions and when the software is executed (by the processor 1116) it is operable to perform the operations described herein. For example, the memory 1114 stores or is encoded with instructions for control logic 1120 to perform operations described herein related to transmitter 218 and receiver 300, e.g., to implement PONS correlator 312. In an example, control logic 1120 causes processor to instantiate PONS correlator 312, and configure the correlator with, e.g., encode the correlator with, a particular row of a PONS matrix against which the correlator correlates input samples.

In addition, memory 1114 stores data/information 1122 used and generated by logic 1120, such as PONS codes, input samples, correlation results, and so on.

Plots

Figure 12:
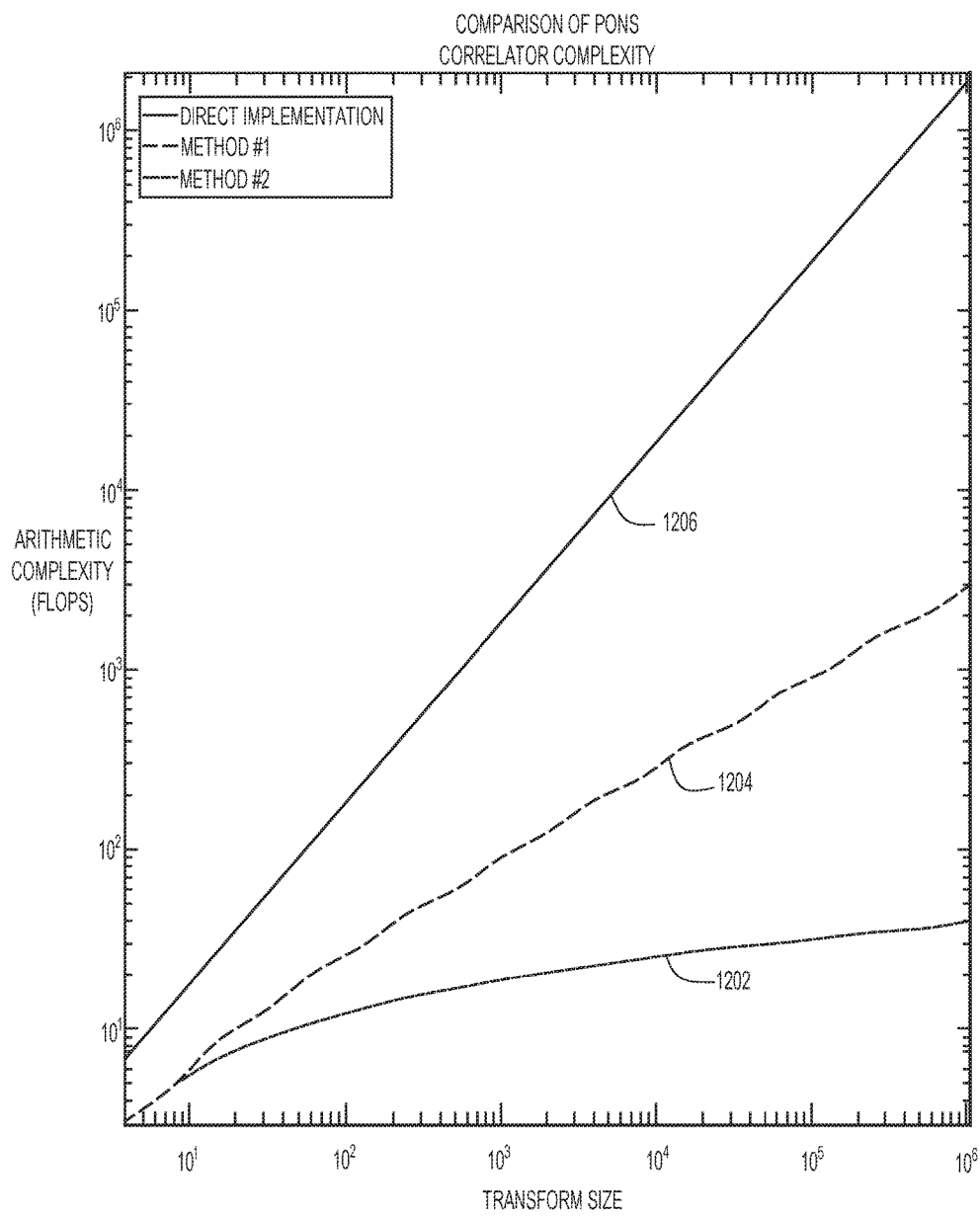
FIG. 12 is a graph that shows computational complexity of the PONS correlator of the first embodiment, the PONS correlator of the second embodiment, and a conventional correlator with respect to floating-point operations (FLOPs), according to an example embodiment.

FIG. 12 is a graph that shows computational complexity 1202 of the PONS correlator of the first embodiment, the computational complexity 1204 of the PONS correlator of the second embodiment, and the computational complexity 1206 a conventional correlator with respect to floating-point operations (FLOPs). The computational complexities of the PONS correlators of the first embodiment (which uses only adds and subtracts, no multiplies) and the second embodiment (which uses only adds and subtracts, effectively no multiplies) are substantially less than that of a regular correlator (which uses multiplies and adds), which performs multiplies and adds between each input sample and each code element.

Figure 13:
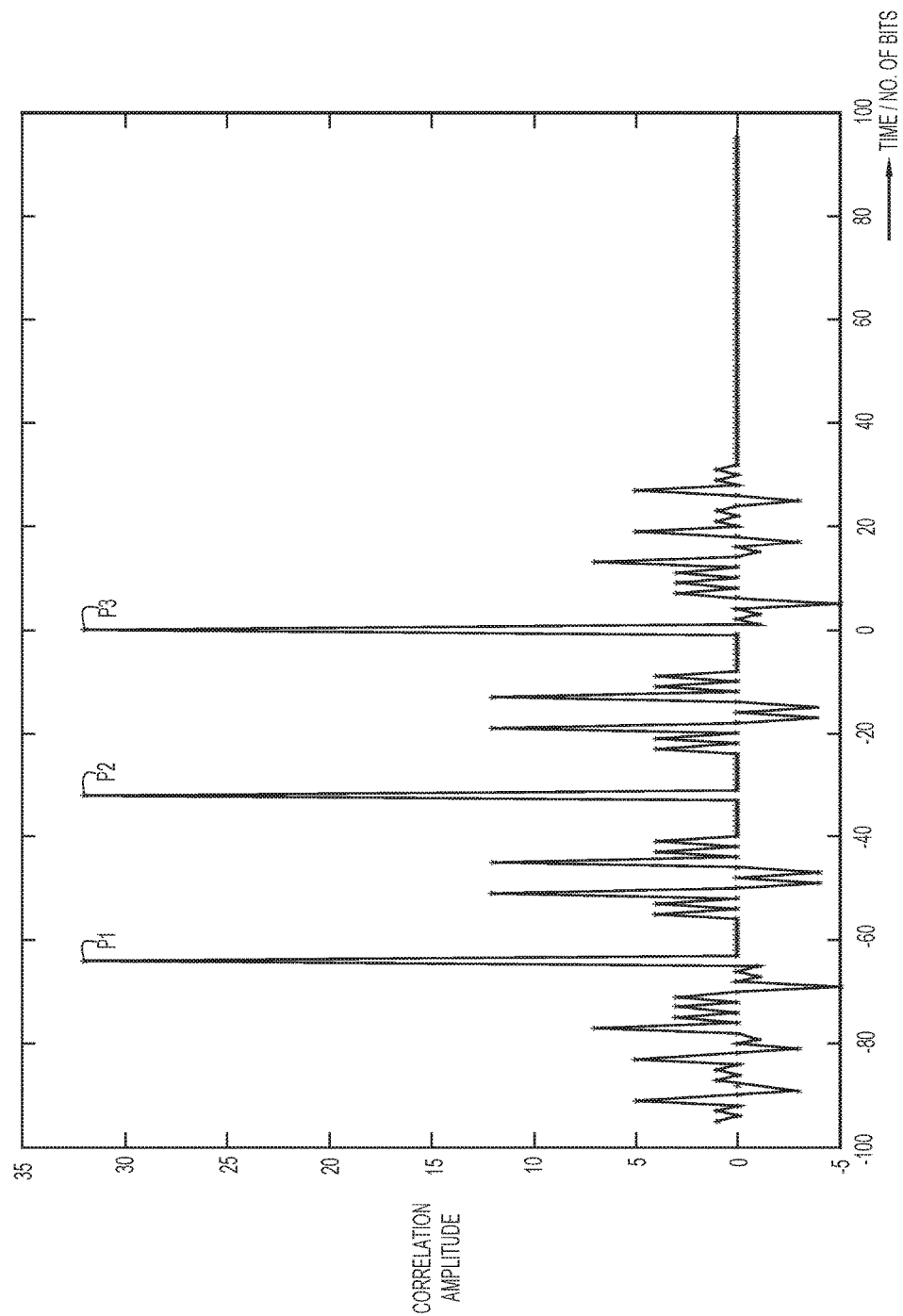
FIG. 13 is a plot of correlation amplitudes against time/input sequence samples produced by the PONS correlator as a result of correlating a PONS code against input samples containing repeating pilot sequences that match the PONS code, according to an example embodiment.

FIG. 13 is a plot of correlation amplitudes against time/input sequence samples produced by PONS correlator 312 as a result of correlating a PONS code encoded into the correlator against input samples containing 3 repeating pilot sequences. The plot includes 3 peaks P1, P2, and P3 spaced apart in time, each corresponding to when a respective pattern of the input samples matches and is time-aligned with the PONS code.

In summary, in one form, an apparatus is provided comprising: an input node; an output node; and successive butterfly elements connected one to the next between the input node and the output node, wherein each butterfly element respectively includes a first branch and a second branch that are cross-coupled with each other and that are configured to perform, collectively, sample add and sample delay operations, wherein either the first branch or the second branch of each butterfly element is further configured to perform a sample inversion, such that a pattern of the sample inversions across the butterfly elements encodes into the butterfly elements a pattern of negative and positive binary values of a particular row of a Prometheus Orthonormal Sets (PONS) matrix, such that the successive butterfly elements are configured to correlate a sequence of input samples applied to the input node against the particular row of the PONS matrix as the input samples are shifted through the successive butterfly elements, to produce at the output node a sequence of correlation results indicative of whether a pattern of the input samples matches the pattern of negative and positive binary values of the particular row.

In another form, a method is provided comprising: at a correlator having an input node, an output node, and successive butterfly elements connected one to the next between the input node and the output node, wherein each butterfly element respectively includes a first branch and a second branch that are cross-coupled with each other and that are configured to perform sample add and sample delay operations, wherein either the first branch or the second branch of each butterfly element is further configured to perform a sample inversion, such that a pattern of the sample inversions across the butterfly elements encodes into the butterfly elements a pattern of negative and positive binary values of a particular row of a Prometheus Orthonormal Sets (PONS) matrix: receiving a sequence of input samples at the input node; and correlating the sequence of input samples against the particular row of the PONS matrix by shifting the input samples through the successive butterfly elements, to produce at the output node a sequence of correlation results indicative of whether a pattern of the input samples matches the pattern of negative and positive binary values of the particular row.

In yet another form, a non-transitory computer readable medium encoded with instructions is provided. The instructions, when executed by a processor, cause the processor to perform: implementing a correlator having an input node, an output node, and successive butterfly elements connected one to the next between the input node and the output node, wherein each butterfly element respectively includes a first branch and a second branch that are cross-coupled with each other and that are configured to perform sample add and sample delay operations, wherein either the first branch or the second branch of each butterfly element is further configured to perform a sample inversion, such that a pattern of the sample inversions across the butterfly elements encodes into the butterfly elements a pattern of negative and positive binary values of a particular row of a Prometheus Orthonormal Sets (PONS) matrix, wherein the instructions to cause the processor to perform the implementing the correlator include instructions to cause the correlator to perform: receiving a sequence of input samples at the input node; and correlating the sequence of input samples against the particular row of the PONS matrix by shifting the input samples through the successive butterfly elements, to produce at the output node a sequence of correlation results indicative of whether a pattern of the input samples matches the pattern of negative and positive binary values of the particular row.

In yet another form, an apparatus is provided comprising: an input node and an output node; successive layers of butterfly elements increasing in number in each successive layer from a top layer including one butterfly element coupled to the input node down to a bottom layer, wherein the butterfly elements of each layer include inputs connected to respective ones of outputs of the butterfly elements of the previous layer; and an output stage to apply to each of at least some of the outputs of the butterfly elements of the bottom layer a respective sample delay followed by a respective gain, to produce a respective delayed weighted value, and to sum the delayed weighted values, wherein sample delays and the gains of the output stage are configured based on a pattern of negative and positive binary values of a particular row of a PONS matrix, such that the successive layers of butterfly elements and the output stage are configured to correlate a sequence of input samples applied to the input node against the particular row of the PONS matrix as the input samples are shifted through the successive layers of the butterfly elements and the output stage, to produce at the output node a sequence of correlation results indicative of whether a pattern of the input samples matches the pattern of negative and positive binary values of the particular row. In the apparatus, the particular row of the PONS matrix may include N of the binary values, wherein N=2x, where x is an integer, and wherein there are a number M of the layers, where M=floor(log 2(N/2)). Also, the output stage may be configured to apply respective programmable sample delays and subsequent gains to at all of the outputs of the bottom layer when x is an even power of 2. Also, the output stage may be configured to apply respective programmable sample delays and subsequent gains only to half of the outputs of the bottom layer when x is an odd power of 2.

In yet another form, a method is provided comprising: at a correlator having an input node, an output node, successive layers of butterfly elements increasing in number in each successive layer from a top layer including one butterfly element coupled to the input node down to a bottom layer, wherein the butterfly elements of each layer include inputs connected to respective ones of outputs of the butterfly elements of the previous layer, and an output stage to apply to each of at least some of the outputs of the butterfly elements of the bottom layer a respective sample delay followed by a respective gain, to produce a respective delayed weighted value, and to sum the delayed weighted values, wherein the sample delays and the gains of the output stage are configured based on a pattern of negative and positive binary values of a particular row of a PONS matrix: receiving a sequence of input samples at the input node; and correlating the input samples against the particular row of the PONS matrix by shifting the input samples through the successive layers of the butterfly elements and the output stage, to produce at the output node a sequence of correlation results indicative of whether a pattern of the input samples matches the pattern of negative and positive binary values of the particular row.

In yet another form, a non-transitory computer readable medium encoded with instructions is provided. The instructions, when executed by a processor, cause the processor to perform: implementing a correlator having an input node, an output node, successive layers of butterfly elements increasing in number in each successive layer from a top layer including one butterfly element coupled to the input node down to a bottom layer, wherein the butterfly elements of each layer include inputs connected to respective ones of outputs of the butterfly elements of the previous layer, and an output stage to apply to each of at least some of the outputs of the butterfly elements of the bottom layer a respective sample delay followed by a respective gain, to produce a respective delayed weighted value, and to sum the delayed weighted values, wherein the sample delays and the gains of the output stage are configured based on a pattern of negative and positive binary values of a particular row of a PONS matrix, wherein the instructions to cause the processor to perform the implementing include instructions to cause the processor to perform receiving a sequence of input samples at the input node, and correlating the input samples against the particular row of the PONS matrix by shifting the input samples through the successive layers of the butterfly elements and the output stage, to produce at the output node a sequence of correlation results indicative of whether a pattern of the input samples matches the pattern of negative and positive binary values of the particular row.

The above description is intended by way of example only. Various modifications and structural changes may be made therein without departing from the scope of the concepts described herein and within the scope and range of equivalents of the claims.

What is claimed is:

1. An apparatus comprising:
   an input node;
   an output node; and
   successive butterfly elements connected one to the next between the input node and the output node, wherein each butterfly element respectively includes a first branch and a second branch that are cross-coupled with each other and that are configured to perform, collectively, sample add and sample delay operations, wherein either the first branch or the second branch of each butterfly element is further configured to perform a sample inversion, such that a pattern of the sample inversions across the butterfly elements encodes into the butterfly elements a pattern of negative and positive binary values of a particular row of a Prometheus Orthonormal Sets (PONS) matrix, such that the successive butterfly elements are configured to correlate a sequence of input samples applied to the input node against the particular row of the PONS matrix as the input samples are shifted through the successive butterfly elements, to produce at the output node a sequence of correlation results indicative of whether a pattern of the input samples matches the pattern of negative and positive binary values of the particular row.

2. The apparatus of claim 1, wherein the particular row of the PONS matrix includes N of the binary values, wherein $N=2^x$, where x is an integer, and there are a number M of the successive butterfly elements, where $M=\log_2 N$.

3. The apparatus of claim 2, wherein the second branch is configured to implement a sample delay that increases by a factor of 2 for each successive butterfly element.

4. The apparatus of claim 1, wherein the first branch and the second branch do not perform any sample multiply operations.

5. The apparatus of claim 1, wherein each butterfly element is configured in either a first arrangement in which the second branch is configured to perform the sample inversion, or a second arrangement in which the first branch is configured to perform the sample inversion.

6. The apparatus of claim 5, wherein for each butterfly element configured in the first arrangement:
the first branch is configured to receive a first sample output by a previous first branch, and add the first sample to a delayed sample from the second branch, to produce a first output sample to be provided as a next first sample to a next first branch; and
the second branch is configured to receive a second sample output by a previous second branch, delay the second sample to produce the delayed sample, invert the delayed sample, and add the inverted delayed sample to the first sample to produce a second output sample to be provided as a next second sample to a next second branch.

7. The apparatus of claim 5, wherein for each butterfly element configured in the second arrangement:
the first branch is configured to receive a first sample output by a previous first branch, invert the first sample, and add the inverted first sample to a delayed sample from the second branch, to produce a first output sample to be provided as a next first sample to a next first branch; and
the second branch is configured to receive a second sample output by a previous second branch, delay the second sample to produce the delayed sample, and add the delayed sample to the first sample, to produce a second output sample to be provide as a next second sample to a next second branch.

8. The apparatus of claim 5, wherein for each butterfly element:
the first branch is configured to receive a first sample output by a previous first branch, and either (i) in the first arrangement, add the sample to a delayed sample from the second branch, or (ii) in the second arrangement invert the first sample to produce an inverted first sample, and add the inverted first sample to a delayed sample from the second branch, to produce a first output sample to be provided as a next first sample to a next first branch; and
the second branch is configured to receive a second sample output by a previous second branch, delay the second sample to produce the delayed sample, and either (iii) in the first arrangement, invert the delayed sample to produce a delayed inverted sample, and add the delayed inverted sample to the first sample, or (iv) in the second arrangement, delay the sample to produce the delayed sample, and add the delayed sample to the first sample, to produce a second output sample to be provided as a next second sample to the next second branch.

9. A method comprising:
at a correlator having an input node, an output node, and successive butterfly elements connected one to the next between the input node and the output node, wherein each butterfly element respectively includes a first branch and a second branch that are cross-coupled with each other and that are configured to perform sample add and sample delay operations, wherein either the first branch or the second branch of each butterfly element is further configured to perform a sample inversion, such that a pattern of the sample inversions across the butterfly elements encodes into the butterfly elements a pattern of negative and positive binary values of a particular row of a Prometheus Orthonormal Sets (PONS) matrix:
receiving a sequence of input samples at the input node; and
correlating the sequence of input samples against the particular row of the PONS matrix by shifting the input samples through the successive butterfly elements, to produce at the output node a sequence of correlation results indicative of whether a pattern of the input samples matches the pattern of negative and positive binary values of the particular row.

10. The method of claim 9, wherein the particular row of the PONS matrix includes N of the binary values, wherein $N=2^x$ and x is an integer, and the correlator includes a number M of the successive butterfly elements, where $M=\log_2 N$.

11. The method of claim 9, wherein the correlating includes, in the second branch, implementing a sample delay that increases by a factor of 2 for each successive butterfly.

12. The method of claim 9, wherein the correlating includes performing the sample add and the sample delay operations, but no sample multiply operations, in the first branch and the second branch collectively.

13. The method of claim 9, wherein each butterfly element is configured in either a first arrangement or a second arrangement, and the correlating includes:
when the butterfly element is in the first arrangement, performing the sample inversion in the second branch but not the first branch; and
when the butterfly element is in the second arrangement, performing the sample inversion in the first branch but not the second branch.

14. The method of claim 13, wherein the correlating includes, for each butterfly element configured in the first arrangement:
in the first branch, receiving a first sample output by a previous first branch, and adding the first sample to a delayed sample from the second branch, to produce a first output sample to be provided as a next first sample to a next first branch; and
in the second branch, receiving a second sample output by a previous second branch, delaying the second sample to produce the delayed sample, inverting the delayed sample, and adding the inverted delayed sample to the first sample, to produce a second output sample to be provided as a next second sample to a next second branch.

15. The method of claim 13, wherein the correlating includes, for each butterfly element configured in the second arrangement:
in the first branch, receiving a first sample output by a previous first branch, inverting the first sample, and adding the inverted first sample to a delayed sample from the second branch to produce a first output sample to be provided as a next first sample to a next first branch; and
in the second branch, receiving a second sample output by a previous second branch, delaying the second sample to produce the delayed sample, and adding the delayed sample to the first sample to produce a second output sample to be provide as a next second sample to a next second branch.

16. A non-transitory computer readable medium encoded with instructions that, when executed by a processor, cause the processor to perform:

implementing a correlator having an input node, an output node, and successive butterfly elements connected one to the next between the input node and the output node, wherein each butterfly element respectively includes a first branch and a second branch that are cross-coupled with each other and that are configured to perform sample add and sample delay operations, wherein either the first branch or the second branch of each butterfly element is further configured to perform a sample inversion, such that a pattern of the sample inversions across the butterfly elements encodes into the butterfly elements a pattern of negative and positive binary values of a particular row of a Prometheus Orthonormal Sets (PONS) matrix, wherein the instructions to cause the processor to perform the implementing the correlator include instructions to cause the correlator to perform:

receiving a sequence of input samples at the input node; and correlating the sequence of input samples against the particular row of the PONS matrix by shifting the input samples through the successive butterfly elements, to produce at the output node a sequence of correlation results indicative of whether a pattern of the input samples matches the pattern of negative and positive binary values of the particular row.

17. The non-transitory computer readable medium of claim 16, wherein the particular row of the PONS matrix includes N of the binary values, wherein $N=2^x$ and x is an integer, and the correlator includes a number M of the successive butterfly elements, where $M=\log_2 N$.

18. The non-transitory computer readable medium of claim 16, wherein the instructions to cause the correlator to perform the correlating include instructions to cause the correlator to perform, in the second branch, implementing a sample delay that increases by a factor of 2 for each successive butterfly.

19. The non-transitory computer readable medium of claim 16, wherein the instructions to cause the correlator to perform the correlating include instructions to cause the processor to perform performing the sample add and the sample delay operations, but no sample multiply operations, in the first branch and the second branch collectively.

20. The non-transitory computer readable medium of claim 16, wherein each butterfly element is configured in either a first arrangement or a second arrangement, and the instructions to cause the correlator to perform the correlating include instructions to cause the correlator to perform:

when the butterfly element is in the first arrangement, performing the sample inversion in the second branch but not the first branch; and when the butterfly element is in the second arrangement, performing the sample inversion in the first branch but not the second branch.

\* \* \* \* \*